United States Patent
Krawietz et al.

[19]

[11] Patent Number: 6,155,303
[45] Date of Patent: Dec. 5, 2000

[54] HOSE WITH INTERLOCKED PROFILE, PARTICULARLY FOR AUTOMOTIVE EXHAUST SYSTEMS

[75] Inventors: Tom Krawietz, Birkenfeld; Michael Pluschke, Neuenbürg-Rotenbach, both of Germany

[73] Assignee: Witzenmann GmbH, Pforzheim, Germany

[21] Appl. No.: 09/311,863

[22] Filed: May 14, 1999

[30] Foreign Application Priority Data

May 14, 1998 [DE] Germany ............... 198 21 596

[51] Int. Cl.$^7$ ....................................... F16L 11/16
[52] U.S. Cl. .................. 138/135; 138/121; 138/148
[58] Field of Search ............................. 138/121, 134, 138/135, 136, 148

[56] References Cited

U.S. PATENT DOCUMENTS

| 630,636 | 8/1899 | Sundh | 138/134 |
|---|---|---|---|
| 1,530,324 | 3/1925 | Pribil | 138/135 |
| 1,913,390 | 6/1933 | Hungerford | 138/135 |
| 2,240,210 | 4/1941 | Dreyer | 138/134 |
| 3,578,777 | 5/1971 | De Gain | 138/121 |
| 3,605,817 | 9/1971 | Bauman et al. | 138/121 |
| 3,682,203 | 8/1972 | Foti et al. | 138/135 |
| 4,029,129 | 6/1977 | Harper | 138/135 |
| 4,141,385 | 2/1979 | Siegwart | 138/135 |
| 5,096,521 | 3/1992 | Schouten | 138/134 |
| 5,601,893 | 2/1997 | Strassel et al. | 138/131 |
| 5,901,754 | 5/1999 | Elsässer et al. | 138/121 |

FOREIGN PATENT DOCUMENTS

| 360295 | 12/1980 | Austria . |
|---|---|---|
| 0 523 341 | 1/1993 | European Pat. Off. . |
| 4121350 | 1/1993 | Germany . |

*Primary Examiner*—James Hook
*Attorney, Agent, or Firm*—Venable; George H. Spencer; Robert Kinberg

[57] ABSTRACT

A hose with interlocked profile, particularly for automotive exhaust systems. The hose is helically stripwound from at least one single-layer or multi-layer metal strip, pre-formed to the shape of an S, with the edges of adjacent strip windings being interlocked with each other by the legs of the pre-form which have the aspect of the S-shaped hooks, and by folded end rims. The hose has radial embossed recesses which bring adjacent interlocked folded edges partially in direct contact with each other.

18 Claims, 4 Drawing Sheets

HOSE WITH INTERLOCKED PROFILE, PARTICULARLY FOR AUTOMOTIVE EXHAUST SYSTEMS

CROSS-REFERENCE TO RELATED APPLICATION

This application claims the priority of German Patent Application No. 198 21 596.7 filed May 14, 1998, the subject matter of which is incorporated herein by reference.

BACKGROUND OF THE INVENTION

The present invention relates to a hose with interlocked profile, particularly for automotive exhaust systems, helically stripwound from a least one single-layer or multi-layer metal strip, pre-formed to the shape of an S, with the edges of adjacent strip windings being interlocked with each other by means of the legs of the pre-form which have the aspect of the S-shaped hooks, and by means of folded end rims.

Conventional hoses with interlocked profile are available, in particular, in two different versions, i.e. with circular cross section and with polygonal cross section. Hoses with interlocked profile and circular cross section have a particularly high leakage resistance, but they tend to unwind, i.e. to break the interlocked connection in a direction opposite to the winding direction. For this reason, adjacent interlocked edges have to be connected firmly with each other in an appropriate way. This is accomplished, for example according to EP 0 523 341, by means of a compressed stiffening corrugation running from radial inside to radial outside.

The leakage resistance of hoses with interlocked profile and polygonal cross section is not as high, but such hoses have the advantage of allowing their rigidity to be adapted, i.e. their capability of decoupling vibrations from adjacent components of an assembly, due to a varying tightness in winding. The polygon edges maintain the original shape and to winding structure of the hose and minimize the tendency to unwinding.

The above-described hoses with interlocked profile are applied either individually as an exhaust line, particularly for trucks, or as a liner combined with a surrounding metal bellows, particularly for exhaust systems in other automotive applications. In the latter case, the metal bellows is the component, which makes the exhaust line resistant to leakage.

Hoses with interlocked profile and polygonal cross section are preferably applied in automotive exhaust systems due to the better adaptability of their rigidity. Depending on the installation conditions and installation position of the engine with which the hose with interlocked profile is connected, what may be required is a very loose winding of the hose with interlocked profile for the purpose of minimizing its rigidity, which means an optimization of its vibration decoupling capacity. Such a loose winding will cause a tendency to the development of noise in operation, since the hose can be shifted by such a distance that it may hit a potentially installed coaxial bellows, or that the adjacent edges which are interlocked under clearance, i.e. the legs and folded rims, may hit each other. At present, attempts are made to avoid the development of noise by means of providing a damping insert between hose with interlocked profile and bellows, for example a wire mesh, which will avoid the direct contact between hose and bellows and restrict the shifting movement of the hose, so that the relative movements of the adjacent interlocked folded edges are reduced.

The only way of solving the problem of noise totally would be to manufacture the hose in tighter windings, thus reducing the clearance in the interlocked sections and also the movability of the hose. Another result, however, would be an increase in deficiency work of the hose, whose reduction was the reason for manufacturing the hose in loose windings.

BRIEF DESCRIPTION OF THE INVENTION

Based on the foregoing, the present has as its object the provision of a hose with interlocked profile of the initially described design, whose characteristic features are a reduction of noise emission combined with a preservation of both movability and little deficiency work, a hose with interlocked profile, particularly for automotive exhaust systems, which hose is stripwound from at least one single-layer or multi-layer metal strip, pre-formed to the shape of an S, with the edges of adjacent strip windings being interlocked with each other by means of the legs of the pre-form which have the aspect of the S-shaped hooks, and by means of folded end rims, the hose having radial embossed recesses to bring adjacent interlocked folded edges partially in direct contact with each other.

The embossed profile can be located either on the radial exterior surface of the hose, which is advantageous in respect to the embossing step in the production process and the possible variety of embossed designs and patterns. On the other hand, the embossed profile can be provided only or additionally on the radial interior surface, which will not cause a change in the outer appearance of the hose in comparison with a hose without such profile, so that there will be no negative optical effect.

This is particularly advantageous if the hose with interlocked profile has a circular cross section. In such case, the interior design may be similar to that of a hose with polygonal cross section, with the embossed profile assuming the function of polygon edges which will, for example, avoid the unwinding of the hose, but will not cause any change in the conventional, round exterior cross section of the hose.

This invention can also be applied in particular for hoses with interlocked profile and polygonal cross section, and thus for automotive exhaust systems. In this case, the embossed profile will create additional partial edges, if there is a distance between the embossed sections and the existing polygon edges. In both cases, only a local application of the embossed profile is provided, whereas the polygon edges run axially along the whole length of the hose. The embossed profile therefore will neither cause a significant reduction of the movability of the hose nor a significant increase in deficiency work during operation.

The embossed profile as provided according to the present invention therefore has the advantage that the positions of the embossed sections are selected in dependence on the stress provided for the application of the installed hose, and that these sections can be provided only or in a higher quantity in those zones of the hose which are subject to excessive stress. This means that an embossed profile can be provided, for example, only in that zone of the hose which is subject to particularly strong vibrations or shifting movements, whereas in the zones which are subject to lower stress, the existing polygon edges are sufficient for a vibration decoupling rate adequate to function.

By means of such an embossed profile, zones with different radial or coaxial distribution of the hose sections which are in contact with each other and whose noise emission thus has been reduced, can be provided. Another possibility is the local modification of the hose characteristics by means of an increase in wall thickness of the embosses profile, with the consequence of, for example, a reduction of movability in specific zones in order to provide a optimum adaptation of the vibration and movement characteristics of the hose with interlocked profile to the individual application conditions.

In another embodiment the radial depth of the embossed profile is selected in dependence on the load in operation, provided for the installed hose, and in the zones which are subject to excessive stress, the embossed profile is deeper than in the other zones of the hose, i.e., for example, on one side, only two adjacent interlocked folded edges or, on the other side, all adjacent interlocked folded edges may have a deeper embossed profile. The effect of this profile can be based either on only a direct contact between the adjacent parts, or on a corrugation-like deformation of the interlocked folded edges in combination with a simultaneous prevention of radial movability.

The embossed profile can be arranged, for example, axially or radially over the whole exterior surface, or in the form of a helix, or just in a stochastic order.

The arrangement of this profile is influenced, for example, by the manufacturing process, i.e. the embossing method. Particularly for continuous hoses supplied by the meter, a continuous embossing of the profile in axial or helical direction, thus providing a uniform arrangement, is recommendable. If the profile is embossed into the dimensioned hose section, the critical zone of the hose can be taken into consideration and thus the quantity, the shape or the depth of embossed recesses as well as their irregular arrangement in radial or axial direction can be provided.

A particularly advantageous embodiment with respect to form and orientation of the embossed recesses is a hose with circular cross section, which is provided with a corrugation extending at an angle of 90° relative to the coil slope, meaning not parallel to the hose axis as is standard. Such a corrugation that conforms to the slope, which preferably should be provided once across the full coil width for each coil but is not aligned with the corrugations of neighboring coils, functions as turning safety until the hose is mounted. On the other hand, it does not hinder the movement of the interlocked profiles. The coiling operation in this case generates only low artificial voltages due to the processing. In addition, the hose can be produced with very low adjustment forces since the contact surface in the corrugated interlocked profile region is smaller than that of traditional hoses with a corrugation.

BRIEF DESCRIPTION OF THE DRAWINGS

Further features and advantages of the present invention are set forth in the following description, taken in conjunction with the drawings, in which.

DESCRIPTION OF THE PREFERRED EMBODIMENTS

Figure 1:
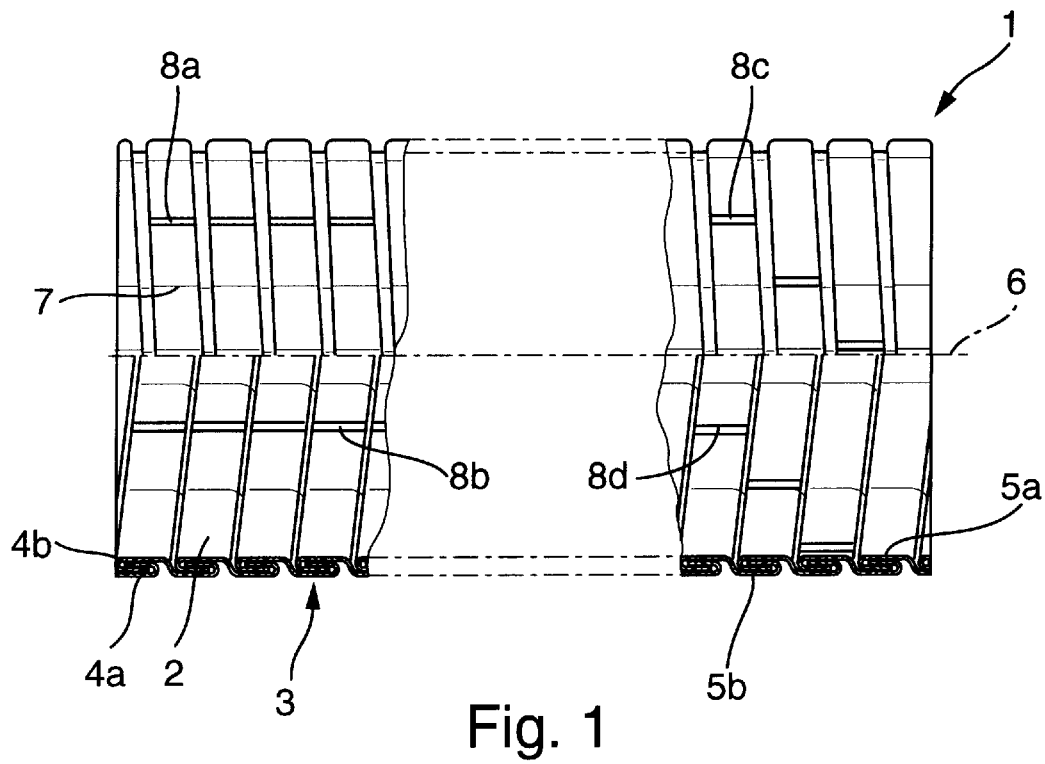
FIGS. 1–4 show different shapes and arrangements of embossed profiles in a hose with interlocked profile, partially in lateral section.

FIG. 1 shows a hose with interlocked profile 1, which has been manufactured by helical winding of an S-shaped metal strip 2, with the strip edges of adjacent windings being fixed to each other by means of interlocked folded edges 3. These interlocked folded edges include the legs 4a, 4b, which have been formed by pre-forming of the strip in the shape of an S, and the folded end rims 5a, 5b in radial sequence, thus forming interlocked folded edges consisting of four layers, as shown in FIG. 1.

Additionally, the hose with interlocked profile 1 shown in FIG. 1 has numerous polygon edges 7 running parallel to the hose axis 6. These edges reduce or eliminate the tendency to unwinding or rebound. Furthermore, the individual layers of the interlocked sections deform towards each other in the zones of the polygon edges until they come in contact with each other.

The advantages in respect to noise reduction as described in the foregoing text are accomplished by applying an embossed profile of different shapes and arrangements to the hose with interlocked profile 1. In the example shown in FIG. 1, upper left section, the profile consists of several rows parallel to the hose axis, with each row consisting of embossed recesses arranged in radial inward direction 8a. In the lower left section of FIG. 1, the embossed recesses 8b are arranged in rows on the interior surface. In the upper right section of FIG. 1, the embossed recesses 8c are arranged helically and uniformly over the whole surface, and in the lower right section of FIG. 1, the embossed recesses 8d are arranged helically on the interior surface of the hose. Each embossed recess 8a–8d has a length equal to the width of the folded edges 3, thus running over the whole width of a folded edge in the form of a line.

Figure 2:
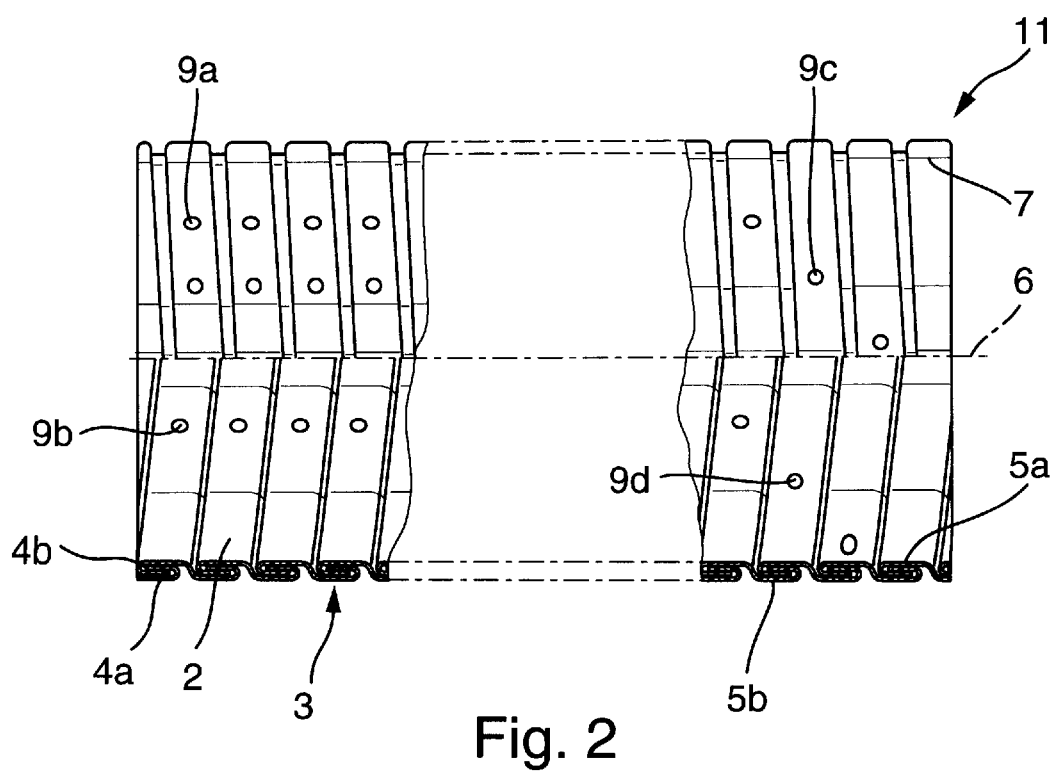

In FIG. 2, a hose of the same design, now referred to as hose 11, has embossed recesses 9a–9d, with an arrangement similar to that of the linear embossed recesses 8a–8d, but having the shape of a dot. In any other respect, the hose 1 from FIG. 1 and the hose 11 from FIG. 2 have corresponding details, therefore also having the same reference marks.

Figure 3:
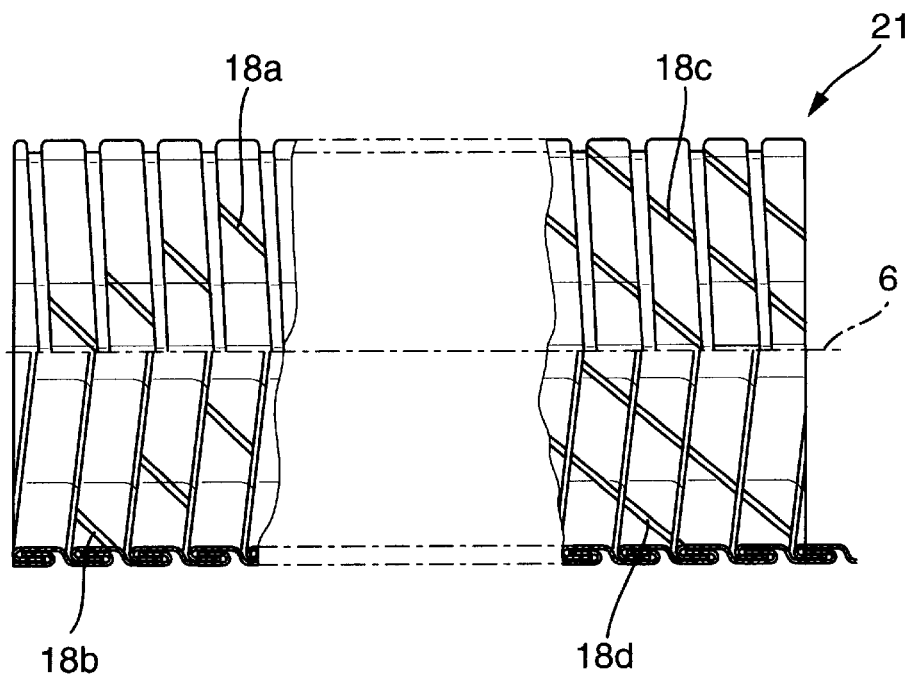

FIG. 3 shows a hose with interlocked profile 21, again with linear embossed recesses 18a–18d, which are distributed uniformly over the whole surface and are inclined toward the hose axis 6. In version 18a (upper left section), the embossed recesses are arranged on the exterior surface and staggered; in version 18b (lower left section), the embossed recesses are arranged on the interior surface and staggered; in version 18c (upper right section), the embossed recesses are arranged on the exterior surface and flush, thus forming several helical rows; and in version 18d (lower right section), the embossed recesses are arranged on the interior surface of the hose and also flush.

Figure 4:
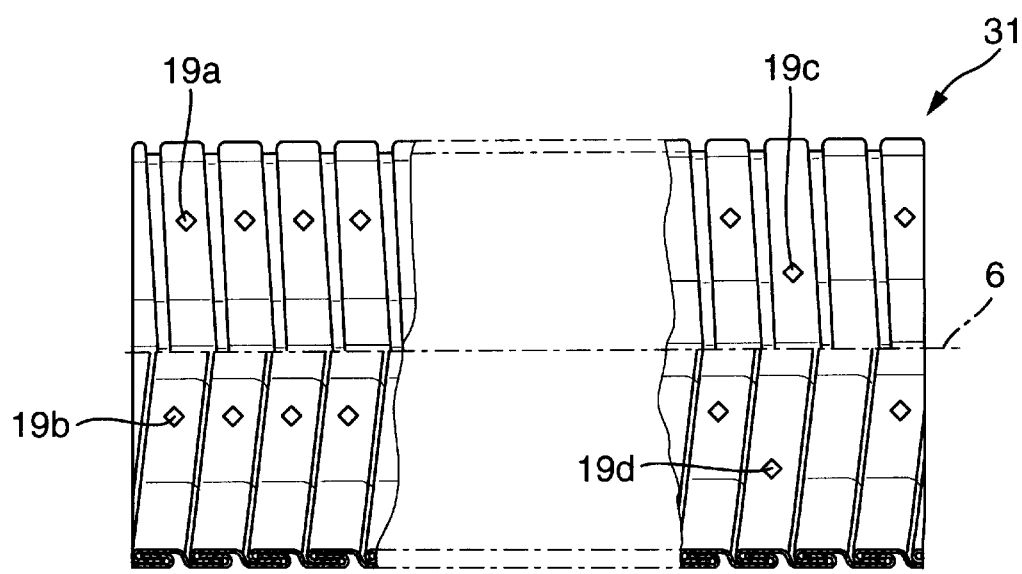

FIG. 4 shows a hose 31 with embossed recesses 19a–19d which have the shape of a rhombus, with each recess being arranged in the center of a folded section between two polygon edges. As in the foregoing example, the embossed recesses of version 19a (upper left section) are arranged in rows parallel to the hose axis 6, on the exterior surface of the hose; in version 19b (lower left section), the embossed recesses are arranged in rows parallel to the hose axis 6, on the interior surface of the hose; in version 19c (upper right section), the embossed recesses are arranged stochastically on the exterior surface of the hose; and in version 19d (lower right section), the embossed recesses are arranged stochastically on the interior surface of the hose.

Figure 5:
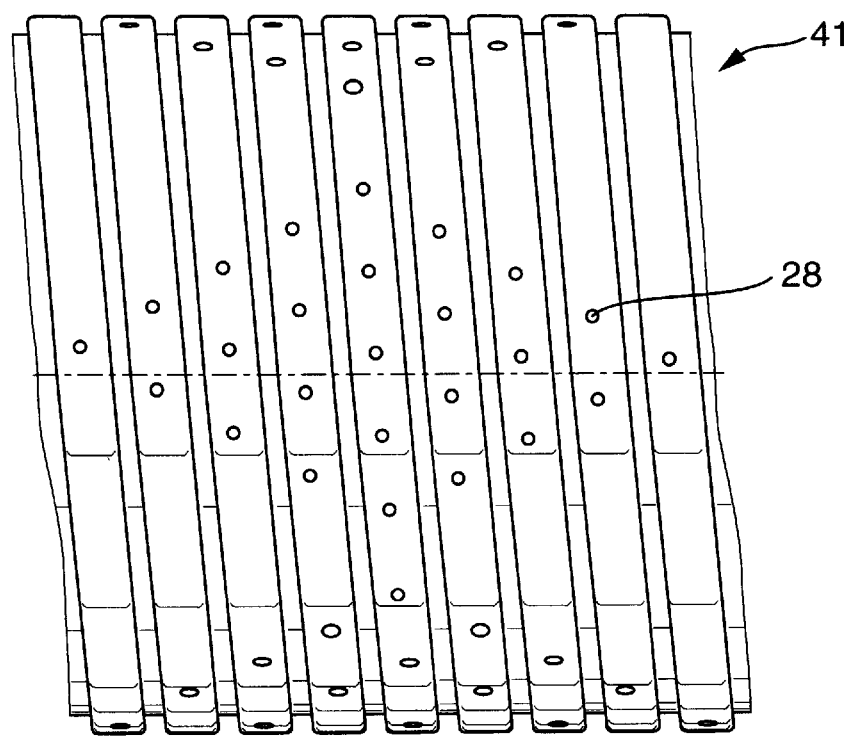
FIG. 5 shows a lateral view of a hose with interlocked profile with an irregular arrangement of the embossed profile in both radial and axial direction.

FIG. 5 shows a lateral view of a hose 41, which has dot-shaped embossed recesses 28, whose quantity and distribution density increase towards the center of the shown axial section. As a result, there are more contact areas with at least dot-shaped contact zones between the adjacent folded windings in this central section than in the exterior axial zones. As a result of this irregular arrangement, the hose with interlocked profile 41 has an irregular movement behavior, which can be useful with hose assemblies consisting of several sections, with each section being subject to a different rate of stress. If a hose section, which is subject to strong vibrations or shifting movements, has a sufficient quantity of embossed recesses, and if the remaining sections, which are subject to lower stress, have no embossed profile, the movability of the zone subject to higher stress is reduced considerably, whereas the movability of the exterior sections is not reduced at all. The relative movement to be absorbed by the hose, or the vibration decoupling, can thus be distributed over the whole length of the hose, with the consequence of a uniform movement and shifting behavior.

This means that, in the case of a constant total vibration decoupling rate, the excessive shifting movement in specific sections, for example in the axial center, are partially transferred to the adjacent exterior sections, thus including them in the decoupling of vibrations. As a consequence, the vibration and shifting amplitudes become uniform, so that it can even be prevented that the hose hits the adjacent metal bellows. As a result, the noise emission of such a hose with interlocked profile is minimized, but its vibration decoupling, deficiency work and movability characteristics will remain unchanged. As another consequence, there will be a more uniform distribution of stress over the length of the hose, combined with a higher uniformity of the maximum shifting amplitude.

Figure 6:
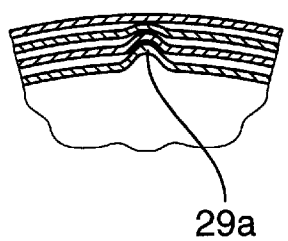
FIG. 6 shows a detailed view of a radial section through a zone of the hose with an embossed recess applied from inside.
Figure 7:
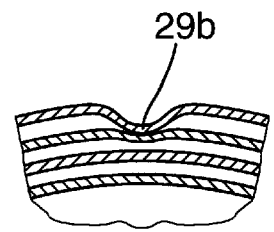
FIG. 7 shows a zone of the hose in a view according to FIG. 6, with an embossed recess applied from outside.

FIGS. 6 and 7 show shape examples of embossed recesses, i.e. embossed recesses 29a, running from the center of the hose in radial outward direction; and embossed recesses 29b, running from the exterior sections of the hose in radial inward direction.

Figure 8:
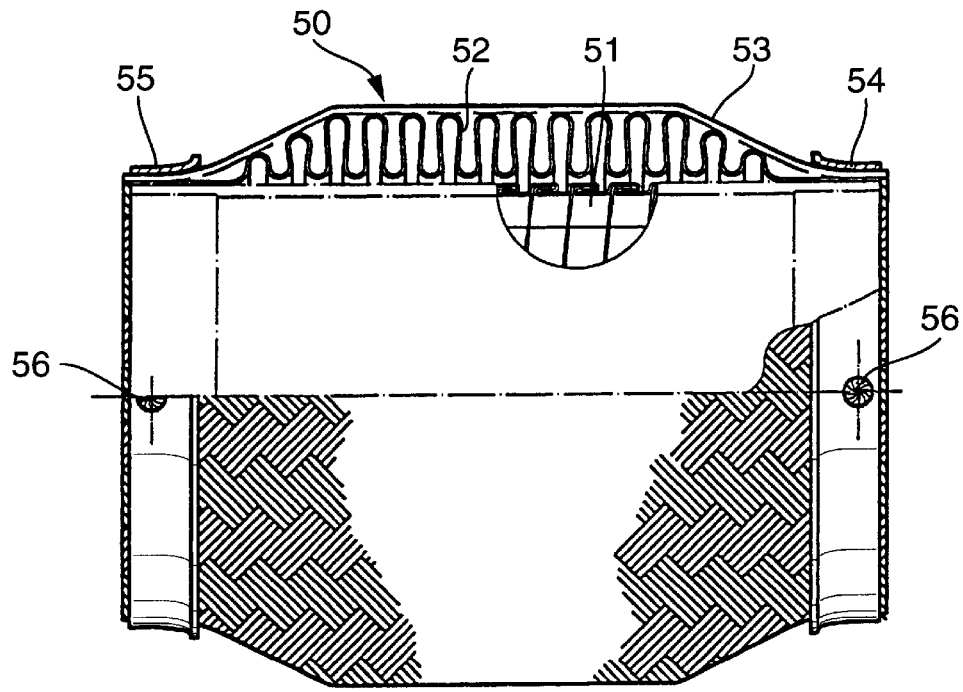
FIG. 8 shows an application example of a hose with interlocked profile installed in a hose joint, in a partial lateral section.

FIG. 8 shows a hose with interlocked profile 51, which is installed in a hose joint 50, together with a coaxially surrounding metal bellows 52 as well as a braiding hose 53 mounted on the exterior surface of the bellows. The hose with interlocked profile 51 with its embossed recesses according to this invention has the function of a liner to convey the exhaust gas flow through the hose joint, whereas the metal bellows surrounding the hose with interlocked profile guarantees the leakage resistance of the hose joint. The ends of the hose with interlocked profile 51, the metal bellows 52, and the braiding hose 53 are equipped with connection elements 54, 55, by which these three components are connected with each other, for example, by means of welding spots 56.

Figure 9:
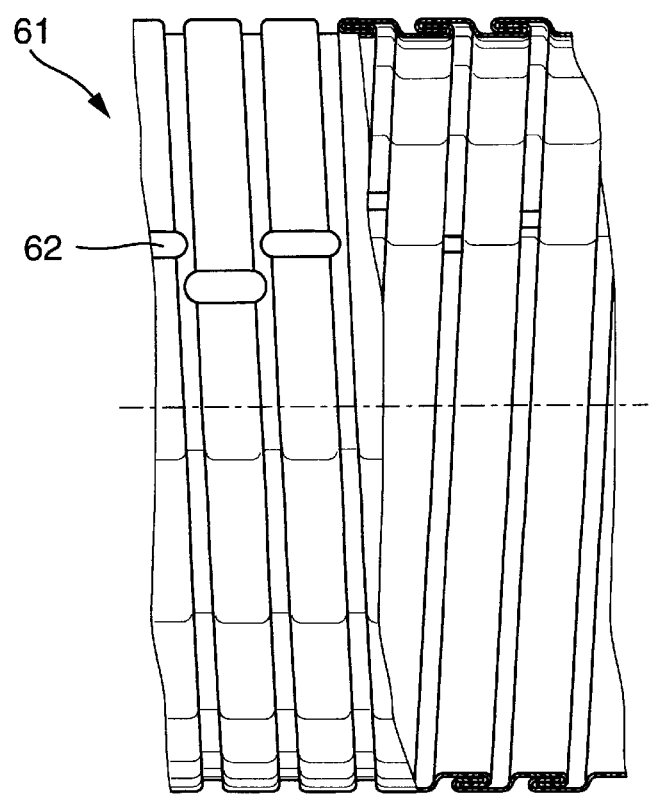
FIG. 9 is a partial section of a view from the side of a hose with alternative embossed profile.

FIG. 9 shows a hose 61 with interlocking profile and corrugations 62, arranged so as to conform to the slope, as embossed profiles that are arranged on the outside, therefore have a longitudinal design and extend at an angle of 90° to the coil slope. These corrugations extend over a complete profile roof. One corrugation is provided for each coil. Owing to the fact that the corrugations extend at an angle to the hose axis and exactly perpendicular to the coil slope, they function as turning safety to a sufficient degree, to be sure, thereby preventing an unraveling of the hose prior to the installation. On the other hand, they hardly obstruct the movement of the mounted hose.

It will be understood that the above description of the present invention is susceptible to various modifications, changes and adaptations, and the same are intended to be comprehended within the meaning and range of equivalents of the appended claims.

What is claimed is:

1. A hose with interlocked profile for automotive exhaust systems, the hose being helically stripwound from at least single-layer or multi-layer metal strip, pre-formed to the shape of an S, with the edges of adjacent strip windings being interlocked with each other by means of the legs of the pre-form which have the aspect of the S-shaped hooks, and by means of folded end rims, the hose having a plurality of polygon edges and having radial embossed recesses which bring adjacent interlocked folded edges partially in direct contact with each other.

2. A hose with interlocked profile according to claim 1, wherein the embossed recesses are applied to the radial exterior surface of the hose.

3. A hose with interlocked profile according to claim 1, wherein the embossed recesses are applied to the radial interior surface of the hose.

4. A hose with interlocked profile according to claim 1, wherein the positions of the embossed recesses are selected in dependence on the stress provided for the application of the installed hose, said recesses being provided only in those zones of the hose which are subject to excessive stress.

5. A hose with interlocked profile according to claim 1, wherein the radial depth of the embossed recesses is selected in dependence on the load in operation, provided for the installed hose, said embossed recesses are deeper than in the other zones of the hose.

6. A hose with interlocked profile according to claim 5, having the embossed portions coact with at least two adjacent interlocked folded edges and with four adjacent interlocked folded edges in sections subject to excessive stress.

7. A hose with interlocked profile according to claim 1, wherein the hose has a circular cross section.

8. A hose with interlocked profile according to claim 1, wherein the embossed recesses and the polygon edges are spaced from each other.

9. A hose with interlocked profile according to claim 1, wherein the embossed recesses are arranged in rows.

10. A hose with interlocked profile according to claim 9, wherein said rows run parallel to the hose axis.

11. A hose with interlocked profile according to claim 9, wherein said rows extend radially over the circumference and perpendicularly to the hose axis.

12. A hose with interlocked profile according to claim 10, wherein said rows extend along a helical course.

13. A hose with interlocked profile according to claim 1, wherein the embossed recesses are arranged stochastically over the hose surface.

14. A hose with interlocked profile according to claim 1, wherein the recesses are embossed during the winding process.

15. A hose with interlocked profile according to claim 1, wherein the recesses are embossed after cutting the continuous hose to the required length.

16. A hose with interlocked profile according to claim 1, wherein the embossed recesses have a linear shape.

17. A hose with interlocked profile according to claim 1, wherein the embossed recesses are dot-shaped.

18. A hose with interlocked profile according to claim 1, wherein the embossed recesses are elongated corrugations which extend primarily in a direction to conform to the slope and thus at an angle of approximately 90° to the coil slope.

* * * * *